Sept. 29, 1964  C. J. WALKER  3,150,732
PROPULSION SYSTEM FOR AIR BORNE GROUND EFFECT VEHICLES
Filed July 1, 1960  2 Sheets-Sheet 1
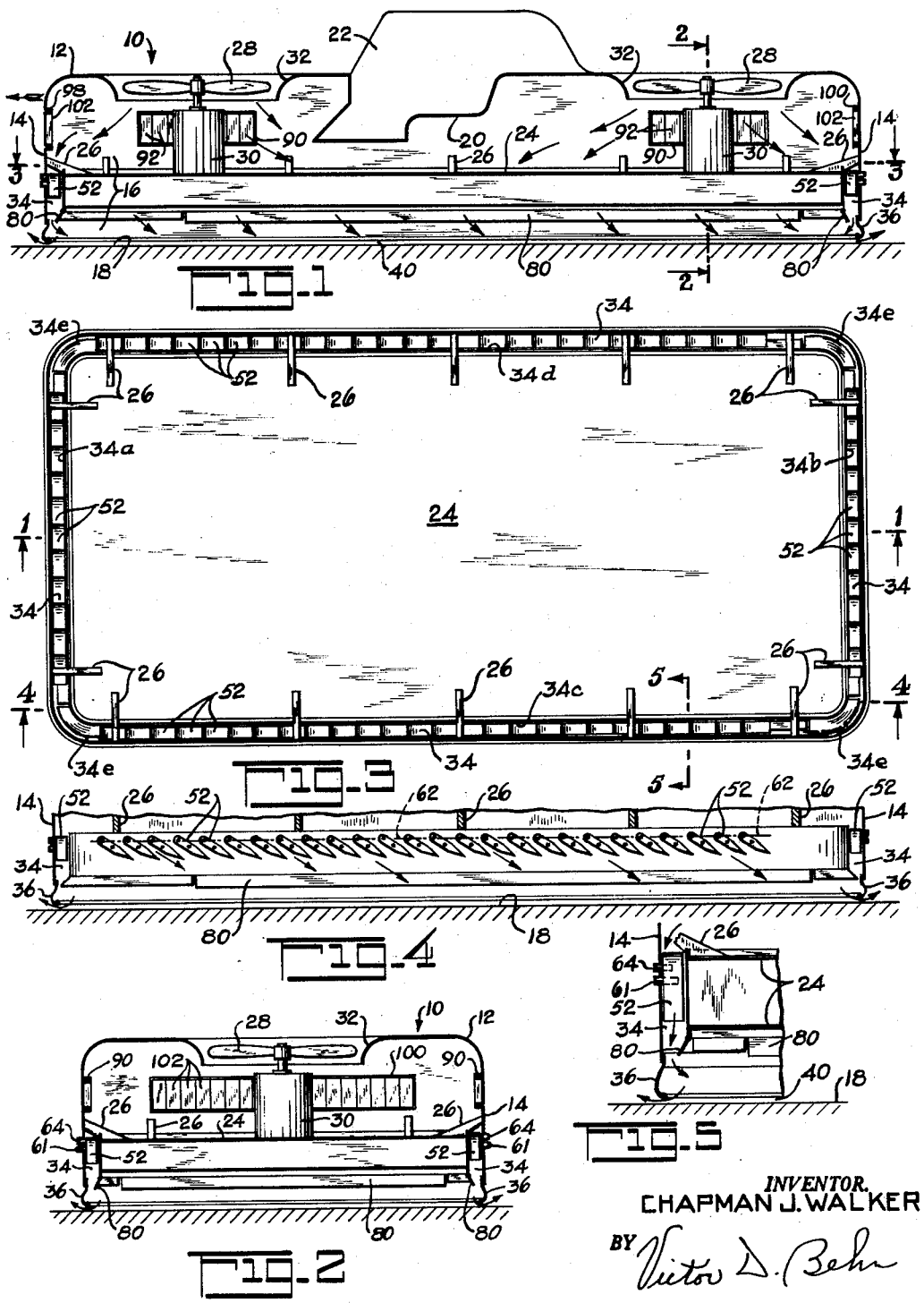
INVENTOR.
CHAPMAN J. WALKER
BY
ATTORNEY

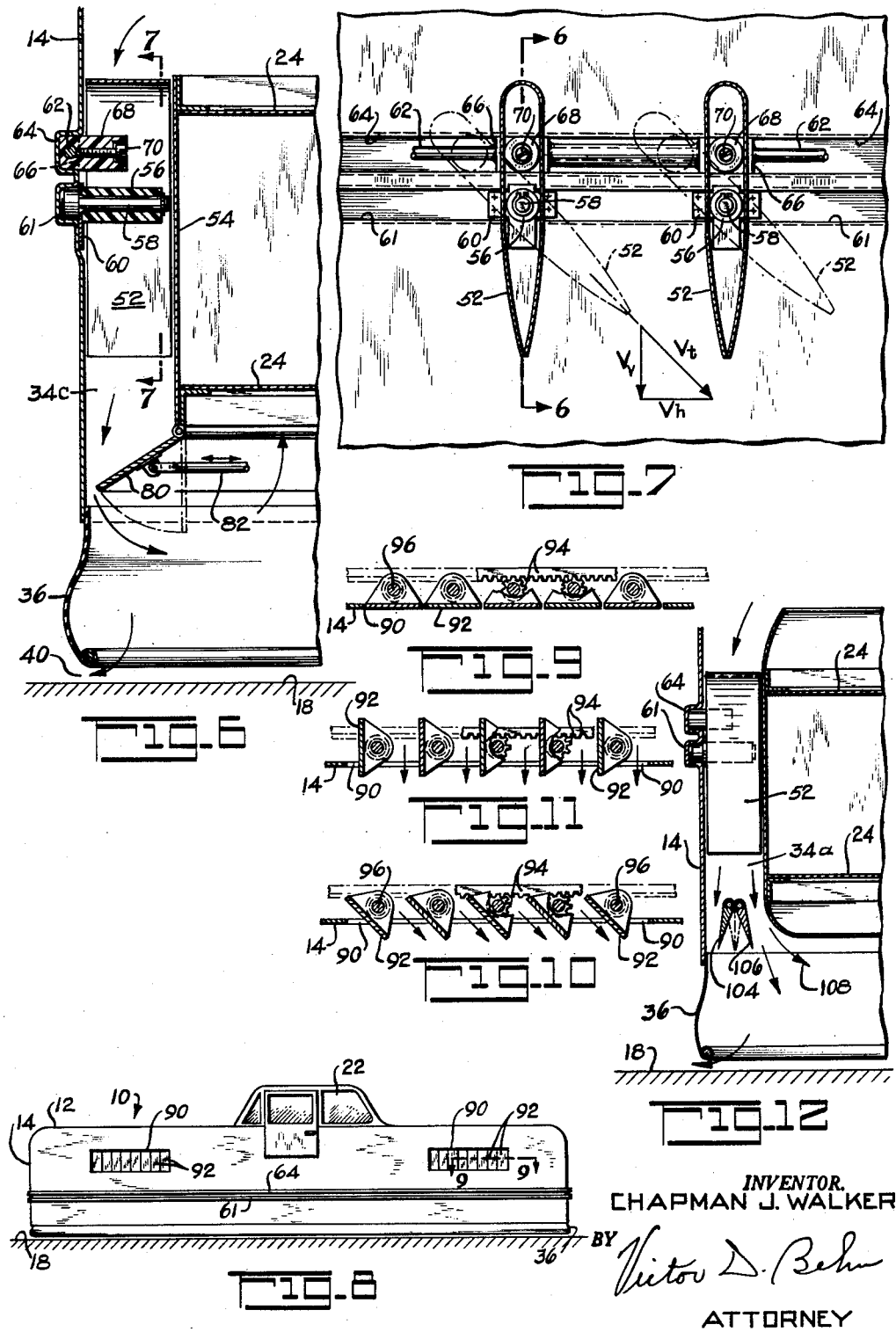

United States Patent Office 3,150,732
Patented Sept. 29, 1964

3,150,732
PROPULSION SYSTEM FOR AIR BORNE
GROUND EFFECT VEHICLES
Chapman J. Walker, Saddle River, N.J., assignor to
Curtiss-Wright Corporation, a corporation of Delaware
Filed July 1, 1960, Ser. No. 40,234
7 Claims. (Cl. 180—7)

This invention relates to air borne ground vehicles and is particularly directed to an improved propulsion system for such vehicles.

By "air borne ground vehicle" is meant a vehicle which is supported by a cushion of air or other fluid between the vehicle and the ground such that at least a major portion of the lift of the vehicle is obtained from the pressure of the air between the vehicle and the ground. Vehicles of this type are capable of operating over various surfaces including water and the term "air borne ground vehicle" as used herein is intended to be broad enough to cover all such vehicles regardless of the type of surface or surfaces over which the vehicle is operated.

A known construction of such a vehicle comprises a housing having a depending peripheral wall forming a chamber having an open bottom into which air under pressure is supplied by an engine driven blower. A known construction of such a vehicle has also included a horizontal partition extending substantially across said chamber below the point at which air is supplied to the chamber, said partition terminating short of the chamber peripheral wall to leave a narrow elongate slot between the periphery of said partition and wall. With this construction, air supplied to the chamber flows downwardly through said slot to the portion of the chamber below said partition, said air escaping under the bottom edge of the chamber peripheral wall from said chamber lower portion. The narrow slot between said partition and the chamber peripheral wall provides sufficient restriction to air flow therethrough so that the pressure in said chamber below the partition although above atmospheric pressure is substantially less than the pressure in the chamber above the partition. In such a vehicle construction, the lower pressure under the partition provides the major portion of the vehicle lift. A small lift force is also created as a result of the air flow through said peripheral slot. The main purpose of this flow through the peripheral slot is, however, to maintain a sufficiently high, above atmosphere, pressure under the partition to support the vehicle. The higher pressure above the partition has been used to provide vehicle propulsion. For this latter purpose the vehicle peripheral wall is provided with one or more openings together with valve means to open or close each such opening thereby controlling the vehicle propulsion.

For a more detailed description of such an air borne ground vehicle attention is directed to copending application Serial No. 17,692, filed March 25, 1960, said copending application and this application being owned by a common assignee.

With this prior construction of an air borne ground vehicle the engine driven blower must supply air to maintain sufficient pressure in the portion of the vehicle chamber under the horizontal partition across said chamber to maintain the required vehicle lift force. In addition, said blower must supply the air discharging through the aforementioned openings in the vehicle peripheral wall for providing the vehicle propulsive force.

An object of the invention comprises the provision of an air borne ground vehicle having an improved and more efficient arrangement for utilizing the air supplied by the engine driven blower of the vehicle.

A further object of the invention resides in an arrangement in which the air flow required for vehicle propulsion also helps to maintain the required pressure under the horizontal partition of the vehicle chamber for providing the necessary vehicle lift force. In this way more efficient use is made of the air flow required for vehicle lift and propulsion.

In accordance with the invention, a plurality of air directing vanes are spaced along the narrow peripheral slot between the aforementioned horizontal partition and the vehicle peripheral wall, said vanes being disposed to impart a horizontal velocity component to the air discharging downwardly through said slot thereby providing the vehicle with horizontal propulsive thrust. In this way at least a portion of the vehicle propulsive thrust can be obtained from the air flowing downwardly through said peripheral slot. Since this thrust producing air is discharged into the lower portion of the chamber under the partition, this same air also helps to maintain the required lift pressure under said partition.

The peripheral slot between the horizontal partition and the vehicle peripheral wall preferably extends around the entire perimeter of said partition whereby said slot has front, rear, and two side sections. In accordance with the invention each of these slot sections may be provided with its own set of flow directing vanes with each set of vanes being separately adjustable to positions for providing horizontal propulsive thrust. The vanes of each set preferably are pivotally supported so that they may be positioned vertically to direct the air flowing therebetween vertically downward or they may be inclined to the horizontal so as to impart a horizontal velocity component to the air flowing downwardly through their slot section. This horizontal velocity component is substantially parallel to the adjacent peripheral wall of the vehicle. Accordingly, the set of vanes disposed along the two side sections of the vehicle peripheral slot may be disposed so as to give air discharging downwardly therethrough a horizontal velocity component in a fore or aft direction depending on the direction of their inclination to the horizontal. In this way these side section vanes can be used to provide the vehicle with forward and/or reverse thrust.

Similarly a set of air directing vanes may be disposed along each of the front and rear sections of the peripheral slot between horizontal partition and the vehicle peripheral wall. These vanes may be inclined to the horizontal so that the air directed by said vanes has a horizontal velocity component which is directed at right angles to the vehicle fore and aft direction. Accordingly, these latter vanes can be used to provide the vehicle with side thrust and/or turning effort.

A still further object of the invention comprises the provision of means for pivotally adjusting said slot vanes in order to control the direction and magnitude of the vehicle horizontal thrust provided by the vanes. Another object of the invention resides in the provision of means for controlling the effective width of said narrow peripheral slot thereby regulating the magnitude of the air flow through said peripheral slot.

In accordance with the invention the set of vanes disposed in each of the two side and in the front and rear sections of the narrow slot between the periphery of the horizontal partition across the vehicle chamber and the peripheral wall of the vehicle are each provided with their own separate means for pivotally adjusting the vanes of said set whereby said sets of vanes can be independently regulated to provide the desired magnitude and direction of the vehicle thrust, for vehicle propulsion, turning and/or for vehicle maneuvering.

The invention also contemplates the provision of means for deflecting the air flowing downwardly through the front section of the slot so that said air has a rearwardly directed horizontal velocity component whereby this air flow also provides the vehicle with forward propulsive thrust. Similar air deflecting means may be provided at the rear slot section to provide reverse thrust.

The invention also has for an object the provision of one or more controllable openings in the peripheral wall of the vehicle for providing horizontal thrust for the vehicle in addition to that provided by the air flow downwardly through the slot between the horizontal partition across the vehicle chamber and the peripheral wall of said chamber.

Other objects of the invention will become apparent when reading the annexed detailed description in connection with the drawing in which:

FIG. 1 is a longitudinal sectional view through an air borne ground vehicle embodying the invention and taken along line 1—1 of FIG. 3;

FIG. 2 is a vertical sectional view taken along line 2—2 of FIG. 1;

FIG. 3 is a horizontal sectional view taken along line 3—3 of FIG. 1 but without the engines mounted on the horizontal partition;

FIG. 4 is a sectional view taken along line 4—4 of FIG. 3;

FIG. 5 is a sectional view taken along line 5—5 of FIG. 3;

FIG. 6 is an enlarged view of FIG. 5 and more specifically taken along line 6—6 of FIG. 7;

FIG. 7 is a view taken along line 7—7 of FIG. 6;

FIG. 8 is a side view of the air borne ground vehicle;

FIG. 9 is a sectional view taken along line 9—9 of FIG. 8;

FIGS. 10 and 11 are views similar to FIG. 9 but showing different positions of the valve mechanism; and FIG. 12 is a view similar to FIG. 6 but illustrating a modified construction for the front section of the vehicle.

Referring to the drawing, an air borne ground vehicle 10 comprises a housing or shell 12 having a depending peripheral wall 14 forming a chamber 16 within said housing. The lower side of the chamber 16, adjacent to the ground 18 or other support surface, is open to said surface. The housing 12 has an internal wall 20 forming a compartment 22 for the vehicle operator and passengers as well as for cargo or luggage.

A partition 24 is disposed generally horizontally across the chamber 16, the housing 12 being connected to said horizontal support structure by brackets 26 for support thereby. The partition 24 preferably forms a rigid support structure for the vehicle. Suitable landing skids (not shown) preferably are secured to the underside of the support structure or partition 24.

At least one fan or blower 28 is provided for supplying air under pressure into the chamber 16 above the horizontal partition support structure 24. Two such blowers 28 are illustrated, each driven by its own engine 30 mounted on the horizontal partition 24. Obviously, instead of two engines 30 a single engine could be used to drive both blowers 28. Each blower 28 is disposed in a passage 32 extending through the upper wall of the housing 12 for supplying air under pressure through its passage 32 into the portion of the chamber 16 above the horizontal partition 24. The horizontal partition 24 terminates short of the peripheral wall 14 of the chamber 16 to leave a slot 34 between the peripheral edge of said partition 24 and said peripheral wall. In addition, a flexible skirt 36 extends around and is secured to the lower edge of the peripheral wall 14 so as to depend therefrom toward the ground 18.

When the engine driven fans 28 of the vehicle are idle, the vehicle rests on the surface 18, the vehicle being supported on this surface preferably by the aforementioned landing skids (not shown) or in the absence of such skids by the peripheral wall 14.

When, however, the fans 28 are operated to pressurize the chamber 16, if said fans have sufficient capacity the pressure builds up in the chamber 16 below the partition 24 to the point at which sufficient lift pressure is provided under said partition to raise the vehicle 10 off the ground. When this happens, the air supplied to the chamber 16 escapes under the skirt 36 through the clearance 40 between said skirt and the ground or other surface 18. The vehicle 10 rises to a heighth above the surface 18 such that the lift force provided by the air pressure within the chamber 16 balances the weight of the vehicle whereupon the vehicle in effect floats on a thin cushion of air between the vehicle and the surface 18. A small lift force is also created as a result of the downward air flow through the peripheral slot 34. In addition the fans 28 produce a small upward force if, as illustrated, they supply their air downwardly into the chamber 16.

The horizontal partition 24 preferably is imperforate to air flow therethrough so that the air supplied to the upper portion of the chamber 16 must flow through the slot 34 to reach the lower portion of the chamber 16 below said partition. The slot 34, between the peripheral edge of the horizontal partition and the peripheral wall 14, is sufficiently narrow in width so that there is substantial resistance to air flow from the upper portion of the chamber 16 through said slot 34 to the lower portion of said chamber below the partition 24. With this arrangement the major portion of the vehicle lift is provided by the lower pressure in the chamber 16 below the horizontal partition 24 as a result of the action of this lower pressure against the underside of said partition. The higher pressure in the chamber 16 above the horizontal partition 24 acts upwardly against the upper wall of the chamber 16 but this force is largely balanced by the downward force on the upper side of said partition 24.

The slot 34 has elongate sections 34a, 34b, 34c and 34d along the front, rear and two sides respectively of the peripheral wall 14 with each said slot section preferably being provided with a plurality or set of vanes 52 spaced therealong. The slot sections 34a, 34b, 34c and 34d are interconnected at the corners by slot sections 34e of even narrower effective width. As already stated the slot 34 provides sufficient resistance to air flow so that the pressure above the partition 24 is substantially greater than that below said partion. For example, in an actual vehicle approximately 12 ft. long and 6 ft. wide in which a pressure of 20 lbs. per sq. ft. in the chamber 16 below the partition 24 was sufficient to raise the vehicle up off the surface 18, the pressure above this partition was about four times that below said partition with the slot sections 34a, 34b, 34c and 34d each having an effective width of no greater than about 2 inches and the corner sections 34e each having an effective width of about ½ inch.

The structure of the slot sections 34a, 34b, 34c and 34d with their respective vanes 52 and actuating means therefor are similar and therefore a description of one of said sections 34c, for example, will apply equally well to the others. The details of this structure are best seen in FIGS. 6 and 7.

The slot section 34c is a narrow elongate slot bounded on one side by the adjacent end wall 54 of the partition 24 and on the other side by the adjacent side portion of the peripheral wall 14. A set of vanes 52 are spaced along the slot 34c with each vane extending across said slot. Each vane 52 has a hollow construction and a bearing bushing 56 is secured to and between its faces, the sides of said bushing being fitted to said faces. A pivot pin 58 is journaled within each bushing 56, the axis of said pin being horizontal and extending across the slot 34c. Each pivot pin 58 has a head received within a horizontal channel 61 in the adjacent peripheral wall 14 and each pivot pin 58 is secured to the peripheral wall 14 by a bracket 60 secured to said wall, as by welding. In this way each vane 52 is mounted for tilting or pivotal movement about the horizontal axis of its pivot pin 58.

In order to regulate the pivotal or tilt position of the vanes 52 for the slot section 34c, an actuator rod 62 is slidingly received within a horizontal channel 64 formed in the adjacent peripheral wall 14. The rod 62 is provided with a plurality of guide members 66 having cylinder bosses 68, there being one boss 68 for each vane 52 with each cylindrical boss 68 being received between the two faces of its vane at a point above the bearing bushings 56 of said vane. Screws 70 anchor the cylindrical bosses 68 in position on the actuating rod 62. With this construction, the set of vanes 52 for the slot section 34c are connected to the actuating rod 62 so that horizontal motion of said actuating rod 62 is effective simultaneously to pivotally move all of the vanes 52 of the set of vanes disposed within the slot section 34c. Similar means are provided for adjusting the pivotal positions of the vanes 52 of the slot sections 34a, 34b and 34d.

FIG. 7 illustrates, in full lines, the vanes 52 in their vertical or neutral positions and in addition, in dot and dash outline, the vanes have been pivotally swung in one direction from their vertical or neutral position substantially to one extreme position in which the vanes are materially inclined to the horizontal. This pivotal movement of the vanes is produced by horizontal movement of the actuating rod 62 toward the left, as viewed in FIG. 7. Similarly, movement of the actuating rod 62 in the opposite direction from its full line position is effective to pivotally swing the vanes 52 in the opposite direction from their vertical or neutral positions of FIG. 7.

When the set of vanes 52 for the slot section 34c is pivotally swung to the dot and dash position of FIG. 7, the velocity of the air flowing downwardly through the slot is inclined to the horizontal as indicated by the velocity vector V$t$, this vector being parallel to the slope of the vanes 52. The velocity V$t$ may therefore be considered as consisting of a horizontal velocity component V$h$ and a vertical velocity component V$v$. Since the air flowing downwardly through the slot section 34c now has a horizontal component this flow produces horizontal propulsive thrust for the vehicle, the direction of this thrust being parallel to the adjacent peripheral wall and being opposite to the direction of said horizontal velocity component V$h$.

It is evident therefore that if the sets of vanes 52 for the two side slot sections 34c and 34d are each inclined so as to direct the air downwardly and rearwardly through their respective side slots, then this air flow through the slot sections 34c and 34d will provide the vehicle with forward propulsive thrust. Similarly, if these vanes 52 are swung in the opposite direction so that the air flow now has a forwardly directed horizontal component, the vehicle will be provided with rearward thrust, for example, for rearward motion or for braking forward motion.

Likewise the vanes 52 for the front and rear slot sections 34a and 34b may be pivotally swung so that the air flow between said vanes is inclined to the horizontal whereby the vehicle is provided with side thrust. If the vanes 52 for the front and rear slot sections are inclined to the horizontal in the same direction this side thrust will move the vehicle sidewise. If, however, the vanes for the front and rear slot sections 34a and 34b are oppositely inclined to the horizontal then the air flow through said slot sections 34a and 34b will produce thrusts in opposite directions thereby serving to turn the vehicle.

With the structure described, when a set of vanes 52 is inclined to the horizontal the air discharging downwardly between said vanes not only produces propulsive thrust for the vehicle but in addition since it flows into the portion of the vehicle chamber 16 below the partition 24 it helps to provide the pressure under said partition giving the vehicle the required lift force.

As is apparent from FIG. 7, when the vanes 52 are swung from their vertical or neutral positions to positions inclined to the horizontal, the effective flow area of the intervane passages progressively decreased. In other words, the flow area of the associated section of the slot 34 progressively decreases as the vanes of a particular set are pivotally moved from their vertical positions. In accordance with the invention, a further control of this flow area is provided in order that the pressure under the vehicle partition 24 can be regulated independently of or in relation to the thrust provided by the vanes 52. For this purpose each slot section 34a, 34b, and 34d is provided with its own adjustable valve member 80 whereby the flow area of the associated section of the slot 34 can be adjusted independently of or in relation to the adjustment of the vanes 52. Each valve member 80 comprises a flat elongate flap-like member for example of sheet metal, which is hingedly connected to the lower edge of the adjacent end wall 54 of the horizontal partition 24 so as to depend from said end wall. A link 82 is connected to each flap member 80 for swinging it toward or away from the adjacent peripheral wall 14 thereby varying the effective area of the associated section of the slot 34.

In order to provide the vehicle with additional thrust for forward reverse or side propulsion or for turning, each of the two sides of the vehicle peripheral wall 14 is provided with one or more openings 90 preferably communicating with the chamber 16 above the partition 24 in order to take advantage of the higher pressure in the upper portion of the chamber 16. Preferably each of the two sides of the peripheral wall 14 has a pair of such openings 90 disposed adjacent to the forward and rear ends of the vehicle as illustrated.

As best seen in FIGS. 9, 10 and 11, each opening 90 may be controlled by a plurality of substantially vertical slat-like members 92 which function as a valve means to control said opening. The slat-like members 92 are disposed in side-by-side relation and each slat-like member is mounted for pivotal movement, for example by rack and pinion means 94, about the axis of a vertical pivot shaft 96. When the slat like members 92 are in their position of FIG. 9 the associated opening 90 is closed. When the slot-like members 92 are in their position of FIG. 11 the associated opening 90 is open wide and the air flow outwardly through this side opening produces horizontal propulsive thrust in the opposite direction. The slat-like members 92 can also be moved to an inclined open position, as in FIG. 10, in which the air flow has a horizontal fore or aft component parallel to the adjacent side of the peripheral wall. With the slat-like members 92 in a position, such as in FIG. 10, fore or aft propulsive thrust is provided depending on the direction of inclination of the slat-like members 92, the direction of the thrust being opposite to the direction of the fore or aft component of the flow through the opening 90.

Similarly, the front and rear sections of the peripheral wall 14 preferably have openings 98 and 100 respectively together with valve means 102 for controlling the air flow therethrough. Like the openings 90, the openings 98 and 100 also communicate with the high pressure portion of the chamber 16 above the partition 24. The valve means 102 may be similar to the valve means 92 for the openings 90.

FIG. 12 illustrates a modification in which the front section 34a of the slot 34 is arranged so that at least a portion of the air flow discharging downwardly therethrough has a rearward horizontal component so as to add to the forward propulsive thrust. For this purpose, in lieu of the member 80, a pair of elongate valve or flap-like members 104 and 106 are supported in side-by-side relation directly under the slot section 34a intermediate the side walls of said slot section. The flaps 104 and 106 run lengthwise of the slot sections 34a and are pivotally supported about horizontal axes adjacent to their upper edges. When the flaps 104 and 106 each depend vertically from their pivot axes, as shown in dot and dash outline, they do not materially affect the air flow through the slot section 34a. The forwardly positioned flap 106 may be swung toward the peripheral wall 14 (as shown in full lines) to restrict the downward air flow through the slot 34a much in the manner that said flow is restricted by the flap 80 in FIG. 6. In addition, the flap 106 may be swung rearwardly as shown in full lines, so as to provide a portion of the air discharging downwardly through the slot 34a with a rearward velocity component as indicated by the arrow 108 thereby adding to the forward propulsive thrust.

Obviously, the flap members 104 and 106 may be used with or without the vanes 52 for their associated slot section 34a.

If desired, flaps similar to the flaps 104 and 106 may be provided along the rear slot section 34b of the slot 34 in lieu of the flap 80. With this arrangement rearward propulsive thrust may be obtained from the air discharging downwardly through the rear slot section 34b.

It is also within the scope of the invention to pressurize the chamber 16 with a gas other than simply air. For example, instead of the engine driven air fans 28, the vehicle could be provided with turbojet engines arranged to discharge their exhaust into the chamber 16. Accordingly, the term "air" as used herein is intended to be broad enough to cover such other gases. Obviously, if a partition 24 is used the turbojet or other gases would be supplied into the chamber 16 above said partition.

While I have described my invention in detail in its preferred embodiment, it will be obvious to those skilled in the art, after understanding the invention, that various changes and modifications may be made therein without departing from the spirit or scope thereof. I aim in the appended claims to cover all such modifications.

I claim as my invention:

1. An air borne ground vehicle comprising a housing having a depending peripheral wall having front, rear and two side wall portions to form a chamber having an open ground-facing bottom side, the lower edge of said peripheral wall forming the periphery of the open bottom of said chamber such that said open bottom has an area approximately equal to the cross-sectional area of the outer periphery of the vehicle and, when the vehicle is at rest, said lower edge of the peripheral wall being disposed substantially in contact with the ground to close the bottom side of said chamber; a generally horizontal partition disposed across chamber adjacent to its open bottom, said partition terminating short of the peripheral wall of said chamber to leave an elongate slot therebetween forming a passage connecting the upper side of said partition with its underside; means for supplying air under pressure into said chamber above said partition so that said air flows down from said chamber through said slot to the underside of said partition from whence it escapes in a generally horizontal direction under the bottom edge of said peripheral wall, said slot being sufficiently narrow to provide a substantial resistance to air flow therethrough so that a substantially higher pressure is maintained in said chamber above said partition as compared to the pressure below said partition and said air flow providing a pressure between the vehicle and the ground sufficient to raise the vehicle off the ground to an extent such that a small clearance is provided between the vehicle peripheral wall and the ground and such that the pressure between the vehicle and the ground provides an air cushion therebetween which provides the main force supporting the vehicle off the ground; a plurality of vanes spaced along a major portion of said elongate slot having substantially flat, vertical and parallel side wall surfaces with each vane extending laterally across and having substantially the width of said slot and being pivotally adjustable about a substantially horizontal axis for inclination to the horizontal so that air flowing downwardly through said slot between said vanes has a horizontal velocity component to provide the vehicle with horizontal thrust, said plurality of vanes including a set disposed along the portion of said slot between said partition and one side wall portion of the vehicle peripheral wall and including a set disposed along the portion of said slot between the partition and the other side wall portion of the vehicle peripheral wall, means interconnecting the vanes of each set for simultaneous pivotal adjustment, said peripheral wall having controllable openings for communication with said chamber above said partition such that when open the air discharging therethrough has a horizontal velocity component to provide the vehicle with horizontal thrust; and valve means operable to control each said peripheral wall opening, pivotal adjustment of said vanes for inclination to the horizontal effects a closing adjustment of the slot thereby increasing the resistance to air flow through said slot and resulting in an increase in the air pressure above said partition whereby the horizontal propulsive thrust produced as a result of any opening adjustment of said valve means is increased.

2. An air borne ground vehicle as recited in claim 1 and in which said controllable openings are in said front, rear and side wall portions of the peripheral wall.

3. An air borne ground vehicle as claimed in claim 1 and including valve structure for at least a portion of said slot sections for further controlling the air flow therethrough.

4. An air borne ground vehicle as claimed in claim 3 and in which said valve structure is a flap-like member pivotally supported along its upper edge adjacent to the underside of its associated slot section and below the adjustable vanes for said slot section.

5. An air borne ground vehicle as claimed in claim 1 and including valve structure for each of said slot sections for further controlling the air flow therethrough.

6. An air borne ground vehicle as claimed in claim 5 and in which each said valve structure comprises a movable member extending along its associated slot section and pivotally connected to the lower edge of the adjacent portion of said horizontal partition so as to depend downwardly therefrom and so as to be disposed below the adjustable vanes for its associated slot section; and including means for varying the pivotal position of each said movable member to vary the effective width of the associated slot section.

7. An air borne ground vehicle as claimed is claim 1 and in which said elongate slot is between said horizontal partition and the section of the vehicle peripheral wall disposed across the front of the vehicle and including a pair of members each pivotally mounted on horizontal axes extending lengthwise of and below said elongate slot and each depending from its axis, said members being disposed adjacent to each other with the one disposed behind the other and with the forward member being pivotally movable to vary the effective width of the forward portion of the slot and with the rear member being pivotally movable to vary the horizontal velocity component of the air discharging through the rearward portion of said slot.

References Cited in the file of this patent

UNITED STATES PATENTS

| | | |
|---|---|---|
| 2,838,257 | Wibault | June 10, 1958 |
| 3,066,753 | Hurley et al. | Dec. 4, 1962 |

FOREIGN PATENTS

| | | |
|---|---|---|
| 219,133 | Australia | Nov. 24, 1958 |

OTHER REFERENCES

"Aviation Week," July 6, 1959, pages 115, 116.
"Popular Science," July 1959, pages 51–55 and 194.
"The Curtiss-Wright Air Car—The Bee," received on Jan. 19, 1960.
"The Curtiss-Wright Air Car—Model 2500," received on Jan. 19, 1960.